Feb. 17, 1931.  J. J. JAKOSKY  1,792,910
METHOD AND APPARATUS FOR LOCATING CONDUCTIVE BODIES
Filed Sept. 4, 1928   5 Sheets-Sheet 1
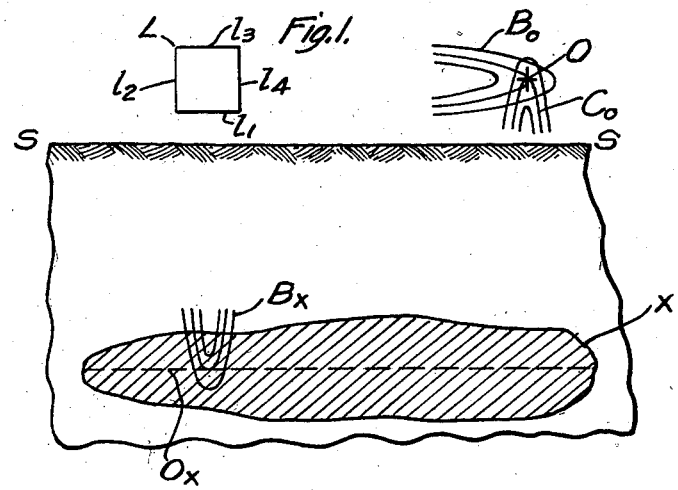
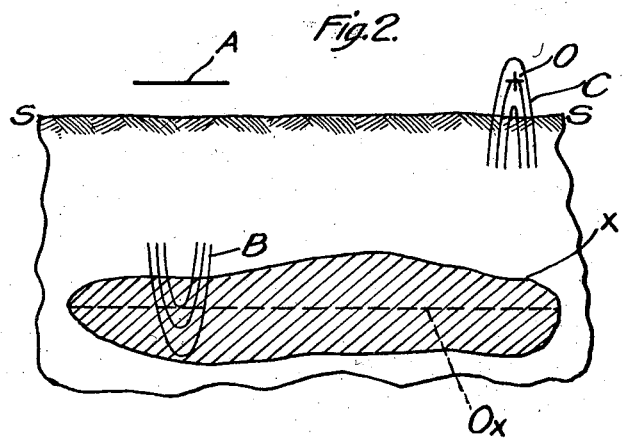
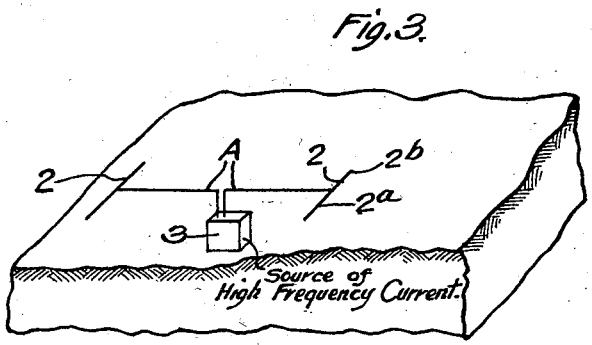
INVENTOR.
John J. Jakosky,
BY
ATTORNEYS

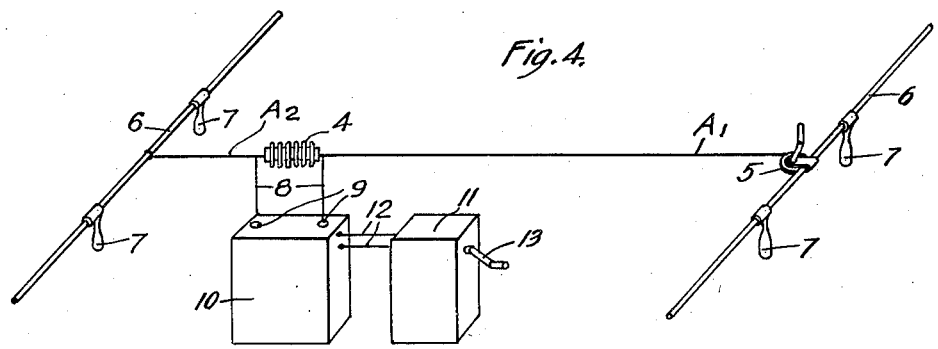
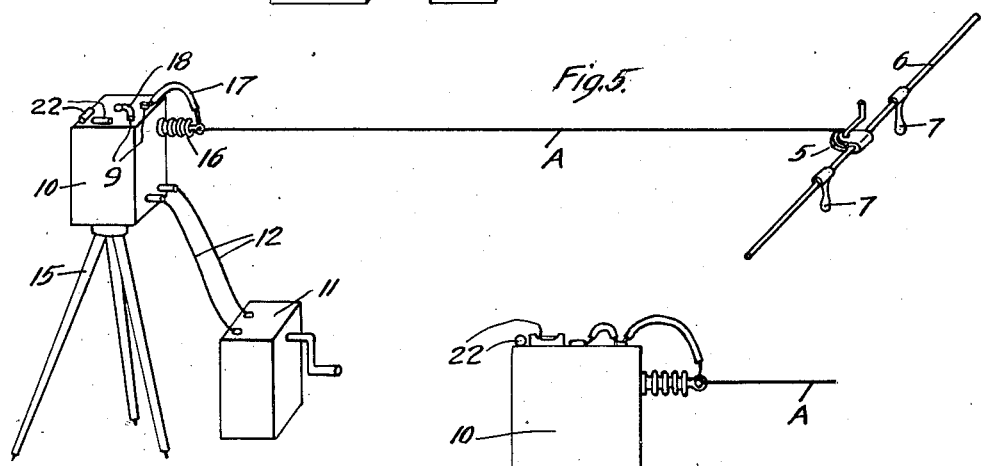
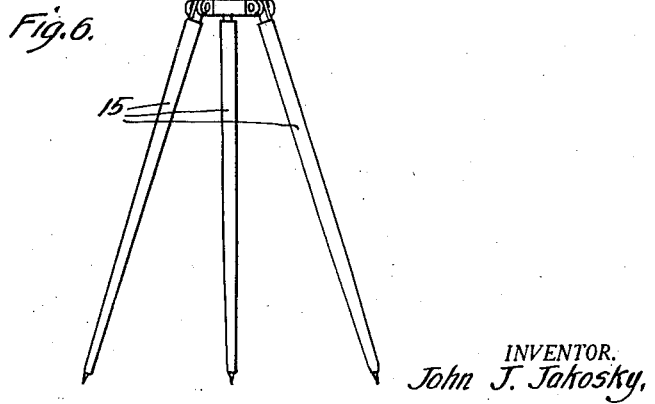

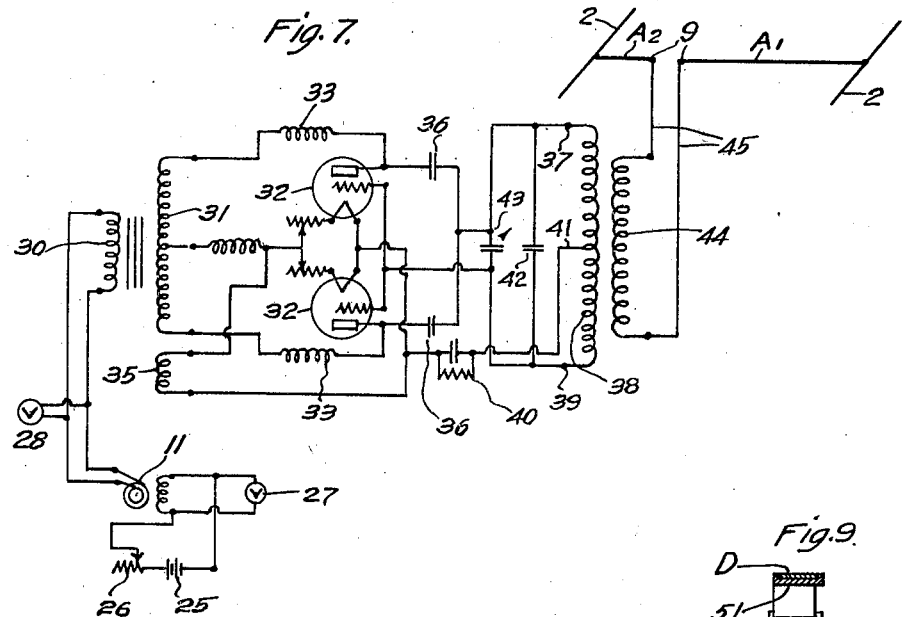

Feb. 17, 1931. J. J. JAKOSKY 1,792,910
METHOD AND APPARATUS FOR LOCATING CONDUCTIVE BODIES
Filed Sept. 4, 1928 5 Sheets-Sheet 4
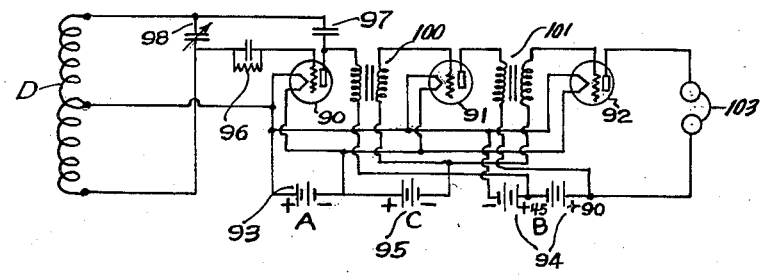
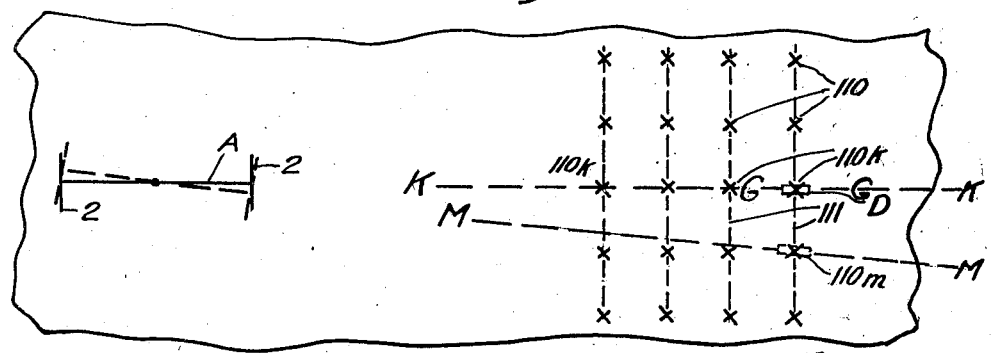
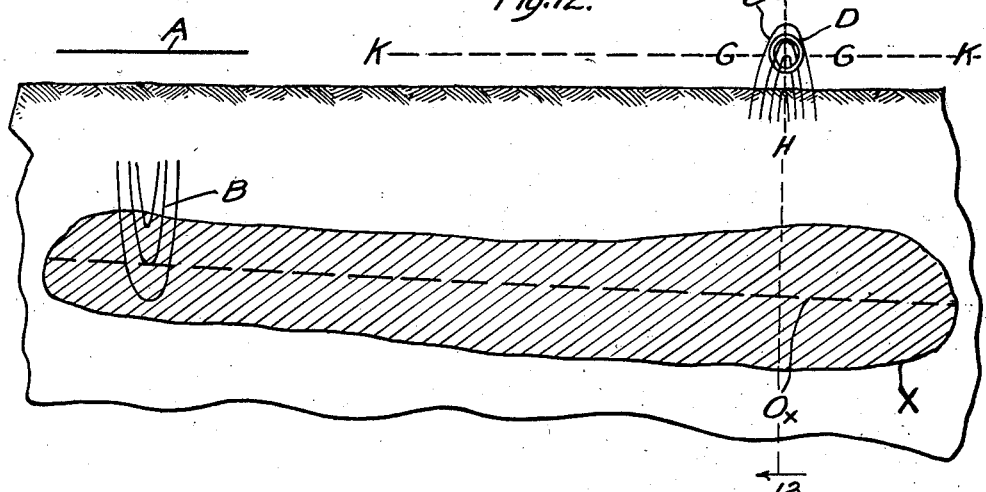
INVENTOR.
John J. Jakosky,
BY
ATTORNEYS Feb. 17, 1931. J. J. JAKOSKY 1,792,910
METHOD AND APPARATUS FOR LOCATING CONDUCTIVE BODIES
Filed Sept. 4, 1928   5 Sheets-Sheet 5

INVENTOR.
John J. Jakosky
BY
ATTORNEYS

Patented Feb. 17, 1931

1,792,910

UNITED STATES PATENT OFFICE

JOHN J. JAKOSKY, OF LOS ANGELES, CALIFORNIA, ASSIGNOR TO THE RADIORE COMPANY, OF LOS ANGELES, CALIFORNIA, A CORPORATION OF CALIFORNIA

METHOD AND APPARATUS FOR LOCATING CONDUCTIVE BODIES

Application filed September 4, 1928. Serial No. 303,797.

This invention relates primarily to the art of electrical prospecting, that is, the location by electrical methods of unknown ore bodies in the earth's crust. It is applicable in general, however, to the location of any electrically conductive bodies, such as pipe lines, wires, or salt water bodies accompanying underground oil deposits, surrounded by a medium of less electrical conductivity than said bodies.

The principal object of the invention is to provide means whereby such conductive bodies may be located more rapidly and with a greater degree of accuracy than by the means heretofore employed, and whereby conductive bodies may be located which lie at greater depths beneath the surface of the earth than it has heretofore been possible to operate.

The method of this invention comprises essentially setting up a primary high frequency electromagnetic field polarized about a straight linear axis which is directed toward a point of observation at a suitable distance, thereby causing flow of induced current in the conductive body to be located and producing a secondary electromagnetic field about said conductive body, and determining the direction of such secondary electromagnetic field at such point of observation by means of a direction-finding device, and repeating these operations for a plurality of points of observation.

Electrical prospecting methods heretofore proposed may be principally grouped in two general classes, namely "applied potential methods" and "inductive methods." (See "Electrical methods of geophysical prospecting," by J. J. Jakosky, Engineering and Mining Journal, Feb. 11, and 18, 1928). In the applied potential system a direct or alternating current is caused to flow through the earth by applying a potential difference between two grounded electrodes or systems of electrodes, and points of equal potential on the earth's surface are then located. Lines are plotted connecting these points of equal potential and any departure of these lines from the direction which they would have in the case of a homogeneous medium furnishes some indication of the existence of bodies of relatively higher or lower conductivity. This method is dependent upon the existence of a medium of substantially uniform resistance around the ore body, which is seldom encountered in practice, and is furthermore obviously incapable of locating ore bodies at any very great depth, for the reason that the lines of equal potential on the surface depend mainly upon the conductivity of only the uppermost strata of the earth.

A variation of this method consists in the use of one or more direction-finding coils to study the electromagnetic field resulting from the flow of current through the earth. It may be seen that in this case the direction-finding coil is subject to a complex system of electromagnetic fields, including the field surrounding the conductor used to apply the required potential difference between the electrodes and the fields surrounding any relatively good conductors in the path of the underground current flow, as well as a broad field resulting from the current flow through the entire underground mass. Under such conditions it is practically impossible to obtain accurate results in many cases. Furthermore, neither of the above methods affords any information as to the depth of the conductive body.

According to the "inductive system" of exploration, on the other hand, the current flow in the conductive body is caused substantially wholly by induction, by enveloping the same in a primary electromagnetic field of relatively high frequency, and suitable observations are then made with a direction-finding coil for the purpose of determining the direction of the secondary electromagnetic field created by the flow of current so induced in the conductive body, and hence locating the axis of such secondary field, which axis lies in general within the conductive body.

Various types of transmitting apparatus have heretofore been employed for creating the primary electromagnetic field in systems of this type, but there have in every case been certain disadvantages connected with the use of all such transmitting means. An important disadvantage thereof has generally been the failure to energize conductive bodies at very great depths, due to the relatively low intensity of the primary electromagnetic field at points below the earth's surface, for reasons hereinafter explained. Accurate exploration by this method has therefore only been possible at limited depths, up to say 200 or 300 feet, without unduly increasing the size and cost of the apparatus. An important object of this invention is to employ a transmitting or energizing apparatus which is adapted to set up an electromagnetic field at points below the earth's surface which is much more intense than that created at equal depths by any of the transmitting means heretofore employed, for the same power consumption and approximate size and cost of equipment. With an energizing apparatus of the type herein described, it is therefore possible to energize conductive bodies at much greater depths than has heretofore been done, and actual surveys which have been made indicate that it is possible, by the use of this type of energizing apparatus, to accurately locate bodies at depths as great as 800 to 1000 feet or more.

Another serious disadvantage of the transmitting means heretofore employed is that the type or configuration of the electromagnetic field produced thereby is such that the direction-finding apparatus is also influenced thereby, as well as by the secondary field about the conductive body. While it has been possible in practice to so locate and orient the direction-finding apparatus with respect to the energizing means that the direction of the primary or energizing field at the position of the direction-finding apparatus is known and may, therefore, be allowed for, it is nevertheless true that the presence of this primary field at the direction-finding apparatus has interfered with the obtaining of the most accurate results and has in some cases led to inaccurate results. A further object of this invention is, therefore, to use an advantageous form of energizing means and to so locate the direction-finding apparatus with respect thereto that, while an intense electromagnetic field is produced in such a direction as to cut an underground conductive body, a minimum effect of the primary field, or substantially no effect at all under ideal or theoretical conditions, is produced upon the direction-finding coil.

With these objects in view I will proceed to describe the principles and method of practicing my invention, together with certain apparatus also forming a part of the invention, with reference to the accompanying drawings, in which:—

Fig. 1 is a diagrammatic representation of the electromagnetic fields involved when a transmitting loop is employed as a source of the energizing field.

Fig. 2 is a similar view of the electromagnetic fields involved when energizing means according to the present invention are employed.

Fig. 3 is a diagrammatic representation of a form of energizing apparatus according to the present invention.

Fig. 4 is a perspective view of one possible form of actual construction of such apparatus.

Fig. 5 is a perspective view of a modified arrangement of the energizing apparatus.

Fig. 6 is a side elevation of the oscillator shown in Fig. 5, illustrating an advantageous mounting means therefor.

Fig. 7 is a wiring diagram of one form of circuit which may be employed for creating the current flow in the energizing conductor of the energizing apparatus.

Fig. 8 is a side elevation of a form of direction-finding apparatus suitable for carrying out this invention.

Fig. 9 is a section through the receiving coil and the adjacent parts of the supporting means therefor, on line 9—9 in Fig. 8.

Fig. 10 is a wiring diagram showing a typical form of electrical circuit for the direction-finding apparatus.

Fig. 11 is a plan view illustrating the relative positions of the energizing apparatus and the direction-finding apparatus for making the survey according to this invention.

Fig. 12 is a vertical section of a portion of the earth's crust showing a conductive body therein and the relative positions of the energizing and direction-finding means.

Figure 13:
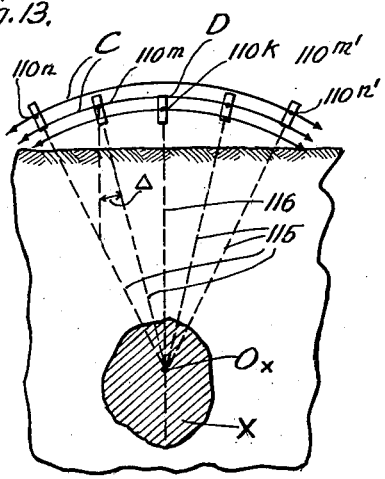
Fig. 13 is a vertical section on line 13—13 in Fig 12, illustrating a typical set of dip readings obtained with the direction-finding apparatus.

The heretofore practiced use of a transmitting loop as a source of the energizing field in the inductive method of electrical prospecting is illustrated in Fig. 1. The surface of the earth is shown at S—S, while an underground ore body whose conductivity is considerably greater than that of the surrounding portions of the earth's crust is indicated at X. With the transmitting loop L disposed in the plane of the paper as shown, the electromagnetic field about said loop will cut said ore body as indicated at $B_x$ and cause an induced current to flow therein. It is well known, however, that a transmitting loop is inefficient as a means of inducing current flow in a distant body, for the reason that the fields created by current flow through each pair of opposite legs of the loop are opposed to one another and exert only a relatively small differential effect due to the relatively small distance between said legs. For example, under the conditions shown in Fig. 1 the conductive body X is actually cut by two opposing electromagnetic fields, one about the leg $l_1$ and one about the leg $l_3$ of the loop. Due to the distance between said legs, however, the field about the leg $l_1$ will be leading slightly the field about the leg $l_3$ at the position of the conductive body X, so that a relatively small resultant field will occur. This resultant effect is necessarily small because the relative phase displacement is relatively small, which is in turn necessarily true by reason of the fact that in any loop of practicable dimensions the distance between the legs $l_1$ and $l_3$ is quite small as compared to the wave length of the electromagnetic fields. For the above reasons the current induced in the conductive body X is necessarily relatively feeble as compared to the energy supplied to the loop and it is largely for this reason that these methods of prospecting have heretofore been unable to locate conductive bodies at any very great depth.

In such processes it is customary to obtain indications of the location of the conductive body by taking readings with a direction-finding coil located at some point on the earth's surface, such as indicated at O. The point O is preferably in the vertical plane of the transmitting loop or substantially so, and the readings are ordinarily taken by rotating the direction-finding coil about an axis pointing toward the transmitting loop (or in some cases about a vertical axis), and noting the variation in intensity of signal reception thereby. The direction-finding coil at this position will then be influenced by a secondary electromagnetic field indicated at $C_o$, resulting from the induced current flow in the conductive body X and also by the primary field indicated at $B_o$, produced by the energizing loop L. The secondary field indicated at $C_o$ is in effect polarized about an electrical axis indicated at $O_x$, said axis lying in general within the conductive body, and if the direction-finding coil at O were effected by this field alone it would be a relatively simple matter to determine the location of said axis and hence the location of the conductive body, by application of the ordinary principles of the use of a direction-finding coil. The presence of the primary field $B_o$, however, introduces certain complications, as the current induced in the direction-finding coil in any certain position thereof represents the resultant of the current which would be induced by the primary field $B_o$ acting alone and that which would be induced by the secondary field $C_o$ alone, provided these two fields are in phase with one another. If these two fields are out of phase at the position of the direction-finding apparatus, the resultant effects thereof on such apparatus are subject to wide variation, dependent upon the amount of the departure from the inphase relation. Hence the direction-finding coil does not indicate the true direction toward the axis $O_x$, the deviation therefrom being dependent upon the relative magnitudes and relative directions of said fields, as well as upon the phase relationship thereof. It may be seen, therefore, that the presence of the primary field $B_o$ at the position of the direction-finding coil introduces certain errors in the readings obtained thereby, and while these errors may in general be corrected for, it would obviously be advantageous if the effect of the primary field on the direction-finding coil would be entirely eliminated.

In Fig. 2 the principle of my present invention is illustrated. In this case the primary field is set up about a straight linear conductor A, preferably extending substantially parallel to the surface of the earth and insulated therefrom, it being understood that the necessary high frequency current flow in said conductor may be produced by suitable means such as hereinafter described. The conductor A may be considered as the equivalent of the leg $l_1$ of the transmitting loop shown in Fig. 1, and the electromagnetic field about said conductor will cut the conductor X as indicated at B. In this case the full effect of the primary field about said conductor is exerted upon the unknown conductive body, as there is no counteracting field as in the case of the transmitting loop. A much more efficient transfer of energy from the energizing means to the conductive body may hence be realized and it is, therefore, possible by this means to cause induction of sufficient current for the purposes of observation in ore bodies or other conductive bodies lying at much greater depth than has heretofore been possible.

Furthermore, the direction-finding coil located at O and substantially on the prolongation of the conductor A is in this case affected substantially wholly by the secondary field C surrounding the conductive body X (neglecting the almost negligible mutual inductance existing between the end of a straight wire and a coil situated on a line with the wire). This, of course, is strictly true in theory only, as distortion of the primary field inevitably results, due to variations in the contour and nature of the earth's surface and to other factors, but it is nevertheless actually true in practice that the effect of the primary field at such points is quite small as compared to its effect at points spaced from such line of prolongation, and may therefore generally be neglected in comparison with the effect of the secondary field set up about an underground conductive body.

It is evident, therefore, that by the use of this form of energizing means comprising a straight linear conductor disposed substantially parallel to the earth's surface, and by locating the direction-finding coil in the line of prolongation of said conductor, not only is it possible to sufficiently energize conductive bodies at greater depths than heretofore, but the direction-finding coil will give indications of substantially the true direction of the secondary field surrounding any such conductive body and thus permit the same to be more easily and more accurately located than by previous methods.

It will be understood that in order to obtain a sufficient flow of current through the above described linear conductor, it is necessary to provide a considerable electrical capacity between the opposite ends thereof, as the ends of the conductor are insulated from the ground and the oscillating circuit must, therefore, be completed by capacity effect rather than by simple conductivity. If the conductor is made of sufficient length, the end portions of the conductor itself may serve to provide the necessary capacity for this purpose, but I pefer in general to use a relatively short conductor in order to facilitate the transportation and manipulation thereof and to provide the necessary capacity by transverse capacity arms or banches of conductive material at the opposite ends thereof, or by any other means such as a counterpoise, adapted to serve in effect as condenser plates for the accumulation of the necessary electrical charge. In case transverse capacity arms are provided at one or both ends of the conductor, it is desirable that said capacity members should be self balancing, that is should provide for equal distribution of the current flow in opposite directions from the conductor to said capacity members, so that the electromagnetic fields produced by the current flow in the respective opposing branches thereof will be substantially equal and will, therefore, counteract or neutralize each other at points along the prolongation of the linear conductor, due to their being of opposite direction.

One general form of energizing apparatus comprising energizing means of the above type is illustrated diagrammatically in Fig. 3. A source of high frequency current indicated at 3 is connected at an intermediate point in a straight linear conductor, such as a straight wire A, such connection being at any suitable position lengthwise of the wire, for example, at or near the mid-point thereof or near one end thereof. Electrically connected to the opposite ends of the wire A and extending substantially perpendicular thereto are two wires or other conductors 2 serving as capacity members comprising two branches 2a and 2b of equal length and extending in opposite directions from the energizing wire A. The wire A preferably extends substantially parallel to the surface of the earth, so that in the portion of the earth's crust beneath said wire the lines of magnetic force of the primary field extend substantially parallel to the earth's surface, and so that the direction-finding coil, which is also located on the earth's surface at a suitable distance from the energizing means, may be placed upon the line of prolongation of said wire. For work in flat country said wire may be maintained substantially horizontal, but if the surface of the earth has considerable inclination as when working in hilly or mountainous country, it is found that more accurate results are obtained by maintaining the energizing conductor parallel to the surface of the earth. A primary electromagnetic field is thus set up about said conductor as an axis, and such field penetrates into the earth, cutting any conductive body occurring in the portion of the earth's crust penetrated thereby, and setting up a secondary field surrounding the same as above described.

The capacity arms or branches may, in general, be disposed either horizontally or vertically or at any other angle, so long as they are perpendicular to the energizing conductor and are well insulated from the ground. However, if the surface layer of the earth is extremely wet, if for any reason such surface layer has an unusually high electrical conductivity, it is preferable to place said capacity arms substantially parallel to the surface of the earth, so that any capacity leakage of the high frequency current from said arms to ground, accompanied by current flow through the ground, would be equalized in the two branches.

Many modifications may be made in the actual construction of an energizing apparatus of this general form. For example, as shown in Fig. 4 the straight linear conductor may comprise a wire consisting of two sections A1 and A2 connected to and separated by a strain type insulator 4 at their adjacent ends. One of these sections, such as A1 may be wound at its outer end upon a winding reel 5 which is mounted upon and electrically connected to a metal bar 6 so as to maintain electrical connection between the rod 6 and said section while permitting the length of the wire to be adjusted as desired by winding or unwinding the same from reel 5. Insulating handle means 7 may be provided on bar 6, whereby the same may be held in the desired position by the operator. The other section A2 may also be wound upon a winding reel for adjustment of the length thereof in the manner above described, or if desired said other section may be connected directly to another rod 6 which is similarly provided with insulating handle means 7, adjustment of the length of the wire being in this case effected by adjustment of the section A1 only. The adjacent ends of the section A1 and A2 may be connected by wires 8 to the terminal means 9 of a suitable source of high frequency current indicated as an oscillator 10. The electric power for energizing said oscillator may be obtained from any suitable source, such as alternator 11 connected by wires 12 to the input of said oscillator as hereinafter described, said alternator being driven in any suitable manner as for example by manual rotation of crank 13.

A particularly advantageous form of energizing apparatus according to this invention is illustrated in Figs. 5 and 6. In this case the oscillator 10 is shown as mounted upon a supporting tripod 15 and connected as before to the alternator 11. One end of the wire conductor A is in this case mechanically supported by insulating support 16 mounted on the oscillator housing and is electrically connected by wire 17 to one of the terminals 9 of the oscillator. The other of said terminals is directly connected as by wire 18 to the metallic housing or box of the oscillator, whereby said housing serves as a counter-poise cooperating with a suitable transverse capacity member at the other end of the energizing wire, which may for example comprise a rod 6 of similar construction to that shown in Fig. 4. The means by which the oscillator 10 is mounted on the tripod 15 preferably include means such as indicated at 20 for orientation or rotation about a vertical axis and means such as indicated at 21 for adjustment about two perpendicular axes for the purpose of leveling. The oscillator may also be provided with level bubble means 22.

Any suitable form of energizing circuit means may be used for producing the necessary high frequency current in the energizing conductor A. An advantageous arrangement of apparatus for this purpose comprises, as above stated, the alternator 11 and oscillator 10, an example of a form of electric circuit therefor being shown in Fig. 7. The alternator itself, indicated at 11, may be excited by current supplied by battery 25 and regulated by rheostat 26. Voltmeters 27 and 28 may be provided for indicating respectively the exciting voltage and the output voltage. The alternator may be adapted to deliver alternating current of any suitable relatively low frequency.

The circuit of the oscillator may comprise an input transformer whose primary winding 30 is connected to the wires 12 aforesaid leading from the alternator. The center of the secondary winding 31 of said transformer is connected to the filaments of thermionic tubes 32, each of which comprises in addition to said filaments the usual plate and grid means of the ordinary three-electrode thermionic tube. The ends of the secondary winding of said transformer are connected through choke coils 33 to the plates of the respective thermionic tubes. The filaments of both tubes may be connected through adjustable resistance means 34 to a separate secondary winding 35 of the transformer adapted to supply current for heating such filaments. The plates of said tubes may be connected through plate stopping condensers 36 to one of the end connections 37 of an induction coil 38, while the grids may be connected to the other end connection 39 of said coil. A connection is also provided from the filaments through grid leak and condenser 40 to the intermediate connection 41 of said coil. Tuning of the circuit to give the desired frequency of oscillation may be accomplished partly by varying the inductance of the coil in any suitable manner and partly by means of loading condenser 42 and variable tuning condenser 43 which are connected as shown between the end connections of coil 38.

The induction coil 38 may be coupled or placed in inductive relationship with a pick-up coil 44, the ends of which are connected by wires 45 to the output terminals 9 of the oscillator, said terminals being connected between the two sections of the energizing conductor or between one end of said conductor and a capacity member, as above described.

It will be understood that the energizing conductor with the capacity members at the ends thereof will have a fundamental oscillating frequency of its own, dependent upon the length of said conductor. With a conductor of relatively short length, however, it will be substantially aperiodic insofar as the frequency of oscillations set up by the oscillating circuit are concerned, in which case the energizing conductor is forced to oscillate at the frequency of oscillation of the oscillating circuit. In some cases, on the other hand, and particularly when working in fairly level country, I may prefer to use an energizing conductor of sufficient length so that its fundamental frequency or a multiple thereof (harmonic) will be equal to the frequency of the oscillating circuit. In the latter case a much greater current will flow in the energizing conductor, due to the lowered impedance of the system.

While I have described one particular type of circuit for producing high frequency current in the energizing apparatus it will be understood that any other suitable means may be employed for this purpose.

For the purpose of determining the presence and the direction of any secondary electromagnetic field in the area being explored and hence determining the location of underground conductors beneath such area, I prefer to employ a direction-finding apparatus comprising a coil or loop antenna mounted upon a tripod or other supporting means and provided with means for levelling or orienting the same, and said coil being so mounted as to permit rotation thereof about an axis whose direction and inclination may be readily adjusted, so that said axis may be directed toward the energizing apparatus even though said energizing apparatus is considerably higher or lower than the direction-finding apparatus.

Such apparatus may comprise, for example, as shown in Figs. 8 to 10, a wire coil D of sufficient turns and dimensions to efficiently intercept, in combination with the tuning means hereinafter described, a sufficient amount of energy from the electromagnetic field produced by the unknown conductor, for the purposes of detection and accurate indication of directions. The coil is wound upon a supporting ring 51 of wood, bakelite or other suitable material of low conductivity, and the coil unit thus provided may be mounted in brackets 52 at the ends of arms 53 extending outwardly from a central supporting plate 54. Plate 54 may be secured by means of bolts 55 to a bearing member 56 which is rotatably mounted on shaft 57 secured to the arms 58 of supporting yoke 59. At the upper ends of said arms are provided sighting devices 60 having cross wires 61 or other devices which may be aligned by sight, the intersections of said cross wires, or other points of alignment being disposed upon a line of sight indicated in dotted lines at F—F in Fig. 8, which is parallel to the axis of rotation of shaft 57 and coil D, said axis being indicated at G—G.

Yoke 59 is secured to a ring or plate 63 which is rotatable, about an axis H—H perpendicular to the line of sight F—F, with respect to a lower ring or plate 64. Plate 63 is provided with a ball or other catch member 65 pressed downwardly by suitable spring means not shown and adapted to engage in any one of four recesses 67 in plate 64, said recesses being spaced 90° apart. Plate 63 may be provided with a mark 88 co-operating with an angular scale 89 on plate 64 for indicating the angular position of the coil about the last-mentioned axis of rotation. Plate 64 is provided with a downwardly projecting arm 69 at the lower end of which is provided a ball 70. Said ball is held between a lower clamping plate 71, mounted at the upper ends of three tripod legs 72, and an upper clamping plate 73. Arm 69 extends through an opening 76 in the upper clamping plate 73, and said opening is of such size, in proportion to the diameter of arm 69, to permit movement of said arm about the center of ball 70 through quite a large angle, preferably an angle of about 30°, or, in some cases, 45°, in any direction from the vertical. Three bolts 74 are provided for clamping ball 70 between said plates, and one or more of said bolts may be provided with a handle 75 whereby the same may be loosened sufficiently to permit free movement of said ball between the plates. This construction permits universal motion of the supporting head comprising yoke 59 and plates 63 and 64 with respect to a supporting base comprising plate 71 and tripod 72, so that said tripod may be set up, and then by loosening the upper clamping plate 73, the supporting head may be moved in any direction about ball 70 as a center, so as to permit alignment of the sighting devices 60 on the desired line of sight as hereinafter described. Handle 75 is then operated to clamp the supporting head in this position.

In order to measure the angular position of coil D about its axis of rotation, with respect to a vertical plane passing through said axis, an angle measuring scale 77 is mounted upon bearing member 56 as by means of arms 78. Said scale cooperates with a mark 79 on segment 80 which is independently rotatable about shaft 57, being supported, for example, by means of arms 81 secured to a hub portion rotatably mounted on said shaft. Segment 80 is provided with a level bubble device 83 which is visible from the front of the apparatus between arms 81. In order to adjust mark 79 to the vertical plane of reference, a worm 84 may be provided, operated by knob 85 and engaging a set of teeth 86 on segment 80.

One form of receiving circuit for the direction-finding apparatus is illustrated in Fig. 10. Such circuit comprises three thermionic tubes 90, 91 and 92, each provided with the usual filament, grid and plate. Suitable means such as A battery 93, B batteries 94, and C battery 95 are also provided for supplying the current necessary for heating the filaments of said tube, for energizing the plate circuits thereof, and for supplying the necessary bias to the grid circuits of the last two tubes. One end of coil D is connected through grid leak and condenser 96 to the grid of the first thermionic tube 90, while the other end of said coil is connected to plate condenser 97 to the plate of said tube. A variable tuning condenser 98 is also connected between the ends of said coil for the purpose of tuning the receiving circuit to the frequency of the electromagnetic field employed. The center of intermediate connection of coil D may be connected to the positive filament terminal of tube 90. Audio frequency transformers 100 and 101 are provided, the primary windings of said transformers being connected in the plate circuits of tubes 90 and 91 respectively and the secondary windings thereof being connected in the grid circuits of tubes 91 and 92 respectively. A suitable electric current indicating device, such as a pair of telephone receivers indicated at 103, is connected in the plate circuit of tube 92. The circuit above described constitutes a well known form of detecting and amplifying circuit and it will be understood that any other suitable form of circuit may be substituted therefor.

In conducting a survey of a given region, using any of the form of energizing means above described, the straight linear conductor A is extended in a direction substantially parallel to the surface of the earth as indicated in Figs. 11 and 12, with the capacity means at the opposite ends thereof. According to a preferred method of locating conductive bodies, such as ore bodies, within the portion of the earth's crust adjacent the energizing station, a series of observations are made with the direction-finding apparatus at a plurality of suitably spaced points 110 on each of a series of parallel traverse lines 111, in an area lying at a suitable distance from the energizing apparatus. The direction-finding coil is preferably far enough away from the energizing apparatus so that any effect of the primary field thereon is minimized or reduced. This distance may be, for example, from 100 feet to 1,000 feet or more, depending on size of apparatus, strength of primary field, length of the underground conductor, and other factors. At each such location of the direction-finding apparatus, the energizing conductor A is aligned directly toward said apparatus so that the position of observation is located upon the line of prolongation of said conductor. For example, referring to Fig. 11 the conductor A is shown as aligned toward the points $110k$ on the several traverses, said points being located on the line of prolongation K—K of said conductor. With the direction-finding coil at the position $110m$, on the other hand, the conductor A should be aligned in the position shown in dotted lines so that said point $110m$ lies on the line of prolongation M—M. This alignment of the energizing conductor may be effected by moving either one end or both ends of said conductor and sighting along the same until it points directly toward the direction-finding coil.

Furthermore, at each position of the direction-finding coil, said coil is oriented so that its axis of rotation G—G (see Fig. 8) extends approximately parallel to the surface of the earth and preferably with said axis aligned directly toward the energizing apparatus, such alignment being effected by loosening the clamp 75 and shifting the head of the direction-finding apparatus upon its ball and socket joint 70, 71, and 73 until the sighting devices 60 are aligned directly, both as to horizontal and vertical projection, upon the end of the energizing conductor. During this alignment it will be understood that the coil D is swung down out of the way of the sighting devices. The handle 75 is then tightened to clamp the device in this position. Segment 80 is then adjusted to bring mark 79 to a vertical plane of reference passing through the axis of rotation of the coil, by means of worm 84, this position being readily determined by observing the level bubble 83.

The energizing apparatus is then energized by operation of alternator 11 so as to cause a primary electromagnetic field to be produced, whose lines of force will cut the assumed conductive body X as indicated at D. The secondary field resulting from the current so induced in said conductive body will then cut the direction-finding coil as indicated at C.

By rotating the direction-finding coil about the aforesaid axis of rotation G—G and noting the resulting variation in intensity of signal reception thereby, it is possible under these conditions to accurately determine the direction of the lines of force of the secondary field, or the projection of such direction upon a plane perpendicular to such axis of rotation, and such direction gives an indication as to the location of the axis $O_x$ of said secondary field. The coil may be rotated until a position of maximum signal reception is found, the direction of the plane of the coil at this time being perpendicular to the lines of magnetic force and indicating a direction toward the source of the secondary field, as shown in Fig. 13. The angle, such as indicated at $\triangle$, between the plane of the coil and a vertical plane of reference through the axis of rotation thereof may be read from scale means 77, and the readings so obtained, commonly termed "dip" readings, are used to determine the location of the conductive body. In actual practice it is customary to determine the position of minimum signal intensity rather than of maximum signal intensity, for the reason that the minimum position may be determined with much greater accuracy and sharpness than the maximum position. Such minimum position, however, is perpendicular to the maximum position, and scale 77 may, therefore, be so graduated as to give the "dip" reading directly when the coil is brought to the minimum position.

The "dip" readings so obtained may be used to determine not only the plan view location of the conductive body but also the depth thereof. The vertical "dip" reading obtained at point $110k$ (Fig. 13), together with the downwardly converging "dip" readings obtained at points $110m$, $110n$, and $110m'$, $110n'$, at opposite sides thereof, indicate that the axis $O_x$ lies beneath the points $110k$, and the series of points thus found on the several traverse lines 111, at which the lines of force of the secondary field extend horizontally and at opposite sides of which such lines of force deviate in opposite directions from the horizontal, determine the plan view location of the axis $O_x$ beneath these points, and thus the approximate plan view location of this part of the conductive body. Furthermore, the "dip" readings obtained at the several points on each traverse indicate directions toward the axis $O_x$ as indicated by the lines 115 in Fig. 13, and the depth at which said lines intersect the vertical line 116 through the point $110k$ will determine the approximate depth of the axis $O_x$ and hence of the conductive body. These lines may not all intersect the vertical line 116 at exactly the same depth, due in part at least to distortion of the wave front of the secondary field upon emerging from the earth's crust, but will in general give indications sufficiently accurate for practical purposes, it being, of course, understood that by suitable correction methods it is possible to determine the exact depth from the depths so determined, if desired.

Figure 14:
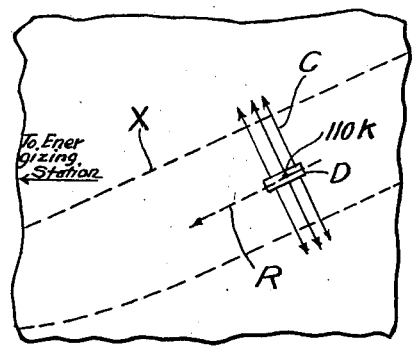
Fig. 14 is a plan view illustrating the method of obtaining indications by rotation of the direction-finding coil about an axis perpendicular to the axis of rotation thereof in Fig. 13.

Indications as to the location of a conductive body may also be obtained by rotation of the direction-finding coil about an axis substantially perpendicular to the earth's surface and preferably perpendicular to the above named axis and lying in the same vertical plane. For example, at the position $110k$, the coil D may be rotated about an axis H—H perpendicular to the aforesaid axis G—G. For this purpose the coil is turned about the axis G—G to a vertical position as shown in Fig. 9 and is then rotated about the axis H—H by turning plate 63 with respect to plate 64. The variation in signal intensity is noted as before, and the position of maximum or minimum signal intensity is determined, thus indicating the direction of the magnetic lines of force C of the secondary field, as projected upon a plane perpendicular to this axis of rotation, such direction being perpendicular to the plane of the coil at the time of maximum signal reception. The direction of the plane of the coil at this time, as indicated by the arrow at R in Fig. 14 gives an indication as to the direction or "strike" of the conductive body shown in dotted lines at X, and the angle between this direction and any suitable reference direction, as read from scale means 89, may be called a "strike" reading.

Figure 15:
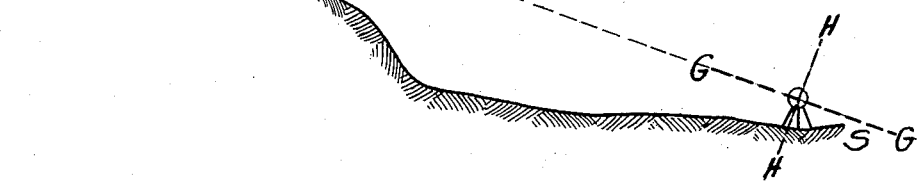
Fig. 15 is a side elevation showing the preferred method of alignment of the energizing conductor and the direction-finding apparatus when operating in hilly or mountainous country.

In Fig. 12 the energizing conductor and the direction-finding coil are shown as located at approximately the same level, and in such a case the axis of rotation G—G extends horizontally and axis of rotation H—H extends vertically. However, in actual practice and particularly when operating in hilly or mountainous country, the energizing station and the direction-finding station will not in general be at the same level, but may be in some such position as indicated in Fig. 15, and in such cases I not only prefer to incline the energizing conductor A in such direction from the horizontal as to point directly toward the direction-finding apparatus, but also prefer to align the direction-finding apparatus with its axis G—G, about which it is rotated in obtaining "dips" readings, inclined in the true direction toward the energizing station and with its axis H—H, about which it is rotated in obtaining "strike" readings, perpendicular to said direction. It will be observed, therefore, that in any case the energizing conductor or straight wire of the energizing apparatus is directed, both as to horizontal and vertical projection, toward the direction-finding apparatus, so that the direction-finding coil lies exactly upon the line of prolongation of said conductor, and that the direction-finding coil is rotated about an axis which is preferably directed, both as to horizontal and vertical projection, toward the position of said energizing conductor, and also if desired about an axis perpendicular to said first-named axis and lying in the same vertical plane therewith. It has also been stated above that the straight linear energizing conductor A, and the axis G—G about which the coil is rotated in obtaining "dips" readings, extends in general substantially parallel to the surface of the earth. This is strictly true in practice only when the surface of the earth is a flat plane, but will hold as a general statement if the term "surface of the earth" be understood to mean a plane surface extending through the energizing and direction-finding stations, and this term is so used herein.

Figure 16:
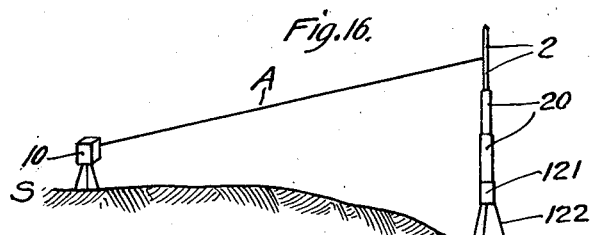
Fig. 16 is a side elevation of a modified construction of energizing apparatus.

For use in particularly rough or uneven country, it may be necessary to provide a greater difference between the heights of the two ends of the energizing conductor above the ground than can conveniently be obtained with the energizing apparatus above described, and in such cases the form of energizing apparatus shown in Fig. 16 may be particularly advantageous. In this case one end of the energizing conductor A is shown as mechanically supported upon the oscillator casing 10 as in the form shown in Fig. 5, it being understood that said energizing conductor is, as before, electrically connected at this end, through suitable means, such as pick-up coil 44 of the above described oscillating circuit, for causing high frequency oscillations therein, to the casing of said oscillator. The other end of the conductor A is connected to the mid-point of a capacity member 2 consisting for example of a vertical metal rod. Said rod may be mounted upon the upper one of a plurality of telescoping extension members 120, the lower one of which may in turn be telescopically mounted in a sleeve 121 supported on tripod 122. With such a construction the height of this end of the conductor may be quickly adjusted by adjustment of the telescopic extension means. The height of the other end of the conductor may remain substantially fixed and the direction thereof properly adjusted by varying the position and height of the end connected to this vertical extension means. The extension members 120 are preferably of insulating material or are well insulated from capacity member 2.

I claim:

1. The method of locating unknown conductive bodies surrounded by a medium of less electrical conductivity than said bodies which comprises setting up a primary high frequency electromagnetic field polarized about a straight linear axis so as to cause induced current to flow in such a conductive body, and then determining, at points upon the line of prolongation of said axis, the direction of the secondary field resulting from such current flow in said conductive body, and hence determining the location of the source of said secondary field.

2. The method of locating conductive bodies within the earth's crust which comprises setting up a primary electromagnetic field of high frequency polarized about a straight linear axis, so as to cause induced current to flow in such a conductive body and create a secondary electromagnetic surrounding the same, and then making observations at a plurality of points on the earth's surface spaced from the source of said primary field to determine the direction of said secondary field, the axis of polarization being directed in each case toward the point of observation.

3. The method of locating underground conductive bodies which comprises setting up a primary electromagnetic field of high frequency by causing high frequency alternating current to flow in a straight linear energizing conductor, such primary electromagnetic field causing induced current to flow in an underground conductive body and hence causing a secondary electromagnetic field to be set up about said body, then determining the direction of the lines of force of said secondary field at a plurality of points spaced from said energizing conductor, by rotating a direction-finding coil about an axis aligned directly toward said energizing conductor and observing the resulting variation in intensity of signal reception by said coil, said energizing conductor being alinged directly toward said direction-finding coil at each point at which such observations are made.

4. The method of locating underground conductive bodies which comprises setting up a primary electromagnetic field of high frequency by causing high frequency alternating current to flow in a straight linear energizing conductor, said primary electromagnetic field causing induced current to flow in an underground conductive body and hence causing a secondary electromagnetic field to be produced about said body, and then determining the direction of the lines of force of said secondary field, at a plurality of points spaced from said energizing conductor, by rotating a direction-finding coil at each of said points about an axis extending perpendicular to the direction from said coil toward said energizing conductor and in the same vertical plane, and observing the resulting variation in intensity of signal reception in said coil, said energizing conductor being aligned in each case directly toward the point at which such observations are made.

5. The method of locating unknown conductive bodies which comprises causing high frequency alternating current to flow in a straight linear conductor having capacity means at its opposite ends, so as to create a primary electromagnetic field polarized about said conductor, such primary field causing induced current to flow in the conductive body to be located and hence creating a secondary electromagnetic field surrounding the same, and making observations at a plurality of points spaced from the source of said primary field, to determine the direction of said secondary field, said straight linear conductor being aligned in each case directly toward the point of observation.

6. An apparatus for locating unknown conductive bodies comprising an energizing apparatus consisting of a straight linear conductor having capacity means at its opposite ends and means for causing high frequency alternating current to flow in said conductor, and a direction-finding apparatus located at a distance from said energizing apparatus and consisting of a receiving coil mounted to rotate about an axis and means for indicating the intensity of high frequency current induced in said coil, the straight linear conductor of said energizing apparatus being aligned directly toward the receiving coil of said direction-finding apparatus.

7. An apparatus for locating unknown conductive bodies comprising an energizing apparatus consisting of a straight linear conductor having capacity means at its ends and means for causing high frequency alternating current to flow in said conductor, and a direction-finding apparatus located upon the line of prolongation of said linear conductor and at a distance from the end thereof and consisting of a receiving coil mounted upon supporting means for rotating about an axis and means for indicating the intensity of high frequency current induced in said coil, said supporting means being adjustable to permit alignment of the axis of rotation of said coil directly toward said energizing apparatus.

8. An apparatus as set forth in claim 7, said capacity means at one end of said linear conductor consisting of conductive means extending transversely to said linear conductor and so disposed as to provide for equal distribution of current flow in opposite directions from said linear conductor to said conductive means.

In testimony whereof I have hereunto subscribed my name this 16th day of August, 1928.

JOHN J. JAKOSKY.